(12) United States Patent
Imai et al.

(10) Patent No.: US 11,143,536 B2
(45) Date of Patent: Oct. 12, 2021

(54) THERMAL FLOWMETER AND METHOD FOR DETERMINING WEIGHTING FACTOR

(71) Applicant: Surpass Industry Co., Ltd., Saitama (JP)

(72) Inventors: Hiroshi Imai, Saitama (JP); Koji Nakajima, Saitama (JP); Kazuo Abo, Saitama (JP)

(73) Assignee: Surpass Industry, Co., Ltd., Saitama (JP)

( * ) Notice: Subject to any disclaimer, the term of this patent is extended or adjusted under 35 U.S.C. 154(b) by 189 days.

(21) Appl. No.: 16/444,507

(22) Filed: Jun. 18, 2019

(65) Prior Publication Data

US 2020/0003598 A1  Jan. 2, 2020

(30) Foreign Application Priority Data

Jul. 2, 2018  (JP) .............................. JP2018-126088

(51) Int. Cl.
  *G01F 1/708* (2006.01)
  *G01F 1/684* (2006.01)
  *G01F 1/69* (2006.01)

(52) U.S. Cl.
  CPC .......... *G01F 1/7084* (2013.01); *G01F 1/6847* (2013.01); *G01F 1/69* (2013.01)

(58) Field of Classification Search
  CPC ...... G01F 1/7084; G01F 1/6847; G01F 1/688; G01F 1/69; G01F 1/6965; G01F 1/684; G01F 25/0007
  See application file for complete search history.

(56) References Cited

U.S. PATENT DOCUMENTS

| | | |
|---|---|---|
| 5,186,150 A | 2/1993 | Sekine |
| 6,446,503 B1 | 9/2002 | Nukui et al. |
| 2016/0245683 A1 | 8/2016 | Igarashi |
| 2017/0358374 A1 | 12/2017 | Loewen et al. |

FOREIGN PATENT DOCUMENTS

| | | |
|---|---|---|
| DE | 103 93 185 T5 | 10/2005 |
| EP | 1 041 367 A1 | 10/2000 |
| JP | 2867125 B | 3/1999 |
| JP | 2014-059191 A | 4/2014 |
| JP | 20160156651 A | 9/2016 |

OTHER PUBLICATIONS

European Extended Search Report for European Application No. 19180761.9, entitled "Thermal Flowmeter and Method for Determining Weighting Factor", dated Nov. 11, 2019, consisting of 9 pages.

*Primary Examiner* — Benjamin R Schmitt
(74) *Attorney, Agent, or Firm* — Hamilton, Brook, Smith & Reynolds, P.C.

(57) ABSTRACT

A thermal flowmeter including a measurement tube that has an inflow port into which a liquid flows and an outflow port that allows the liquid which flows in from the inflow port to flow out, and has an internal flow passage where the liquid flows formed to extend along an axis, and a plurality of detection sections each of which has a heating resistor and a temperature detecting resistor along the axis and is provided at the measurement tube, and a control section that calculates a flow rate of the liquid flowing through the internal flow passage based on signals from the plurality of detection sections, wherein the plurality of detection sections are respectively provided with predetermined intervals left in a circumferential direction with the axis as a center.

3 Claims, 15 Drawing Sheets

THERMAL FLOWMETER AND METHOD FOR DETERMINING WEIGHTING FACTOR

CROSS-REFERENCE TO RELATED APPLICATIONS

This application claims priority under 35 U.S.C. § 119 or 365 to Japanese, Application No. 2018-126088, filed Jul. 2, 2018. The entire teachings of the above application are incorporated herein by reference.

TECHNICAL FIELD

The present invention relates to a thermal flowmeter and a method for determining a weighting factor.

BACKGROUND ART

There is known a thermal flowmeter that has a heating resistor and a temperature detecting resistor bonded to a measurement tube along a flowing direction of a liquid, and measures a flow rate of the liquid flowing in the measurement tube from a timing of heating the liquid by the heating resistor and a timing of liquid temperature detection by the temperature detecting resistor (for example, PTL 1).

PTL 1 discloses the thermal flowmeter that measures the flow rate of the liquid flowing through the measurement tube by bonding one glass substrate where the heating resistor and the temperature detecting resistor are formed on a detection surface, to the measurement tube.

CITATION LIST

Patent Literature

[PTL 1] Japanese Unexamined Patent Application Publication No. 2016-156651

SUMMARY

Technical Problem

When a flow passage tube which is connected to an inflow port side of the measurement tube is flexible and bends, for example, in the thermal flowmeter, there is the possibility that the velocity distribution of the liquid becomes ununiform in the process of flowing through the flow passage tube, and the flow in which the velocity distribution of the liquid flowing through the measurement tube is uniform is not formed. Then, it is feared that the flow rate which is measured differs depending on the bonding position of the glass substrate. That is, when the velocity distribution of the liquid flowing through the measurement tube is not uniform, there is the possibility of being unable to measure the flow rate with high precision.

The present invention is made in the light of the circumstances like this and has an object to provide a thermal flowmeter capable of measuring a flow rate with high precision even when a velocity distribution of a liquid flowing through a measurement tube is not uniform, and a method for determining a weighting factor of the thermal flowmeter.

Solution to Problem

In order to solve the above described problem, a thermal flowmeter and a method for determining a weighting factor of the thermal flowmeter of the present invention adopt the following solutions.

That is, a thermal flowmeter according to one aspect of the present invention includes a measurement tube that has an inflow port into which a liquid flows and an outflow port that allows the liquid which flows in from the inflow port to flow out, and has an internal flow passage where the liquid flows formed to extend along an axis, a plurality of detection sections each of which has a heating resistor and a temperature detecting resistor along the axis and is provided at the measurement tube, and a control section that calculates a flow rate of the liquid flowing through the internal flow passage based on signals from the plurality of detection sections, wherein the plurality of detection sections are respectively provided with predetermined intervals left in a circumferential direction with the axis as a center.

The plurality of detection sections included by the thermal flowmeter according to the present aspect are provided with the predetermined intervals left in the circumferential direction with the axis of the flow passage as the center. According to this, the flow rate can be calculated based on the signals from the detection sections provided in a plurality of directions with respect to the circumferential direction of the flow passage. Even if a velocity distribution of the liquid that flows in the flow passage is not uniform, the variations in the flow rate due to the nonuniformity of the flow velocity distribution and the positions of the detection sections can be suppressed by properly processing the respective flow rates calculated based on the signals from the plurality of detection sections which are provided with the predetermined intervals left in the circumferential direction by the control section. Accordingly, even when the velocity distribution of the liquid flowing through the measurement tube is not uniform, the flow rate can be measured with high precision as compared with the case where the flow rate is calculated based on the signal from the detection section in one direction.

Further, when differences of a predetermined value or more are detected by the control section in the respective flow rates calculated based on the signals from the plurality of detection sections, an installation state or a connection state of the thermal flowmeter or the flow passage tube connected to the thermal flowmeter is determined as abnormal, and the abnormality can be reported to a user by issuing an alert or the like, for example.

Further, in the thermal flowmeter according to one aspect of the present invention, the plurality of detection sections are provided at equal angle intervals in the circumferential direction with the axis as the center.

According to the thermal flowmeter according to the present aspect, even when the velocity distribution of the liquid that flows in the flow passage is not uniform, the variations in the flow rate due to nonuniformity of the flow velocity distribution and the position of the detection section can be suppressed by the control section properly processing the respective flow rates calculated based on the signals from the plurality of detection sections provided at the equal angle intervals in the circumferential direction. For example, when the two detection sections are provided at the measurement tube at the equal angle intervals in the vertical direction (that is, when the two detection sections are provided at the measurement tube so as to face each other at an upper position and a lower position in the vertical direction), and when the flow velocity of the liquid flowing through the flow passage is low at an upper side in the vertical direction and is high at a lower side, the velocity difference of the flow velocity can be substantially cancelled by averaging the respective flow rates calculated based on the signals from the two detection sections. Accordingly, as compared with the case where the flow rate is calculated based on the signal from the detection section in one direction, the flow rate can be measured with high precision.

Further, in the thermal flowmeter according to one aspect of the present invention, the control section calculates the flow rate of the liquid flowing in the internal flow passage by averaging flow rates obtained based on signals from the respective detection sections.

According to the thermal flowmeter according to the present aspect, nonuniformity of the flow velocity can be substantially cancelled. Accordingly, as compared with the case where the flow rate is calculated based on the signal from the detection section in one direction, the flow rate can be measured with high precision.

Further, in the thermal flowmeter according to one aspect of the present invention, the control section calculates the flow rate of the liquid flowing in the internal flow passage by weighting the respective flow rates obtained based on the signals from the respective detection sections and thereafter adding up the respective flow rates.

According to the thermal flowmeter according to the present aspect, nonuniformity of the flow velocity can be substantially cancelled. For example, when the two detection sections are provided at the measurement tube at the equal angle intervals in the vertical direction (that is, when the two detection sections are provided at the measurement tube so as to face each other at the upper position and the lower position in the vertical direction), and when the flow velocity of the liquid flowing through the flow passage has a velocity difference between the upper position and the lower position in the vertical direction, the influence of the velocity difference can be suppressed by weighting the respective flow rates calculated based on the signals from the two detection sections and thereafter adding up the flow rates, depending on the velocity difference. Accordingly, as compared with the case where the flow rate is calculated based on the signal from the detections section in one direction, the flow rate can be measured with high precision. Further, depending on the velocity distribution of the liquid flowing through the flow passage, the flow rate can be measured with higher precision as compared with the case where the flow rates are simply averaged.

Further, in the thermal flowmeter according to one aspect of the present invention, the control section compares a flow rate obtained based on a signal from one of the detection sections and a flow rate obtained based on a signal from another detection section, and a larger flow rate is weighted more heavily than a small flow rate.

According to the thermal flowmeter according to the present aspect, the flow rate can be measured with higher precision as compared with the case where the flow rates are simply averaged.

Further, a method for determining a weighting factor of a thermal flowmeter according to one aspect of the present invention is a method for determining a weighting factor of a thermal flowmeter that includes a measurement tube that has an inflow port into which a liquid flows and an outflow port that allows the liquid which flows in from the inflow port to flow out, and has an internal flow passage where the liquid flows formed to extend along an axis, a plurality of detection sections each of which has a heating resistor and a temperature detecting resistor along the axis and is provided at the measurement tube, and a control section that calculates a flow rate of the liquid flowing through the internal flow passage based on signals from the respective detection sections, wherein the respective detection sections are respectively provided with predetermined intervals left in a circumferential direction with the axis as a center, and the control section calculates the flow rate of the liquid flowing in the internal flow passage by multiplying respective flow rates obtained based on signals from the respective detection sections by a weighting factor and thereafter adding up the respective flow rates, and the method includes a step of causing a liquid at a reference flow rate that is already known to flow through the internal flow passage, a step of using a plurality of the weighting factors and calculating a plurality of weighted flow rates corresponding to the respective weighting factors, a step of calculating a standard deviation of each of the weighted flow rates from the reference flow rate, and a step of acquiring the weighting factor at a time of the standard deviation becoming smallest.

According to the method for determining a weighting factor of a thermal flowmeter according to the present aspect, the most suitable weighting factor in the reference flow rate can be acquired in advance by an experiment, for example. By using this weighting factor, the flow rate can be measured with better accuracy. For example, the reference flow rate is set roughly in accordance with the flow rate range expected for an application in consideration of the application of the thermal flowmeter. Thereby, the optimal weighting factor in the expected flow rate range can be acquired in advance, and the flow rate can be measured with higher precision in the flow rate range. A plurality of weighting factors may be acquired from a plurality of reference flow rates.

Advantageous Effects

According to the thermal flowmeter and the method for determining a weighting factor according to the present invention, the flow rate can be measured with high precision even when the velocity distribution of the liquid flowing through the measurement tube is not uniform.

DESCRIPTION OF EMBODIMENTS

Hereinafter, a thermal flowmeter and a method for determining a weighting factor according to the present invention will be described with reference to the drawings.

First Embodiment

Hereinafter, a thermal flowmeter 100 of a first embodiment of the present invention will be described with reference to the drawings.

The thermal flowmeter 100 of the present embodiment is a thermal flowmeter that heats a liquid flowing in an internal flow passage 10c, and measures a flow rate of the liquid by detecting a temperature of the heated liquid. The thermal flowmeter 100 of the present embodiment is suitable for measuring a very small flow rate of, for example, 0.1 mL/min to 100 mL/min.

Figure 1:
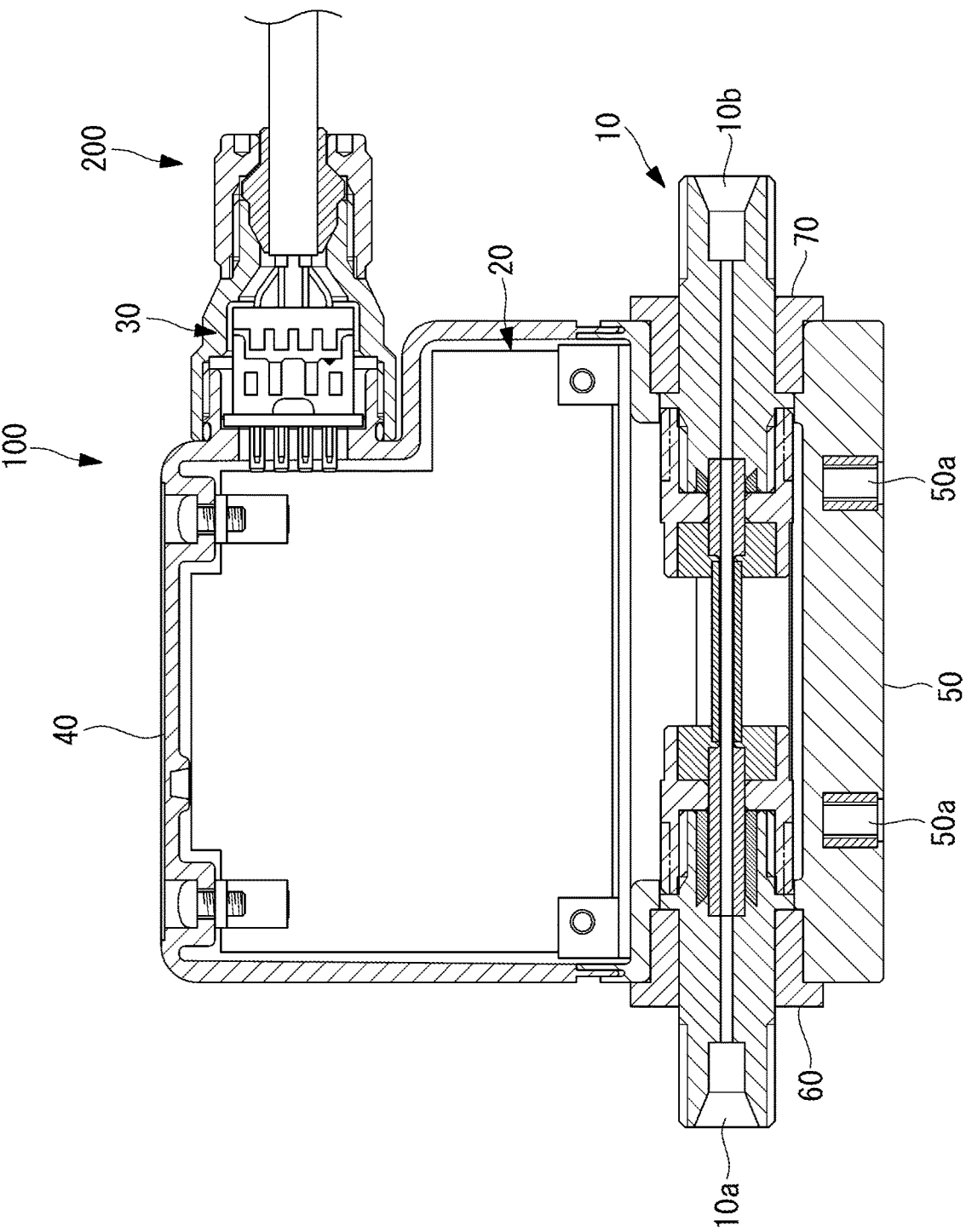
FIG. 1 is a vertical sectional view of a thermal flowmeter according to a first embodiment.
Figure 2:
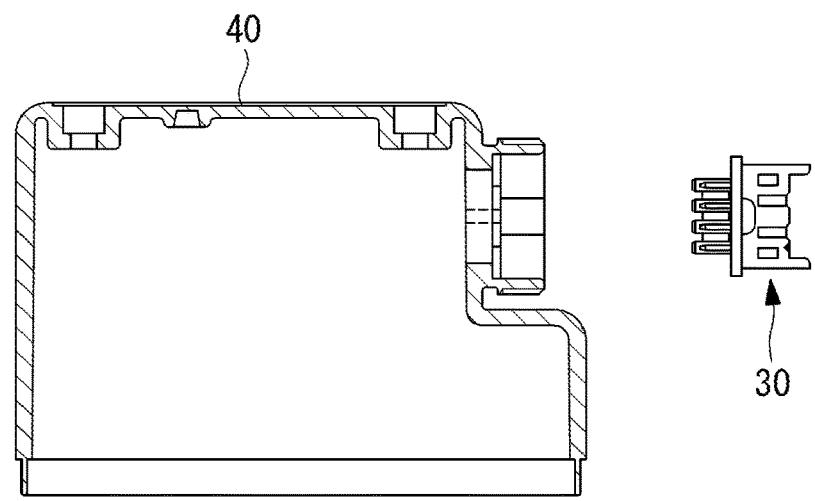
FIG. 2 is an exploded assembly diagram of the thermal flowmeter shown in FIG. 1.
Figure 2:
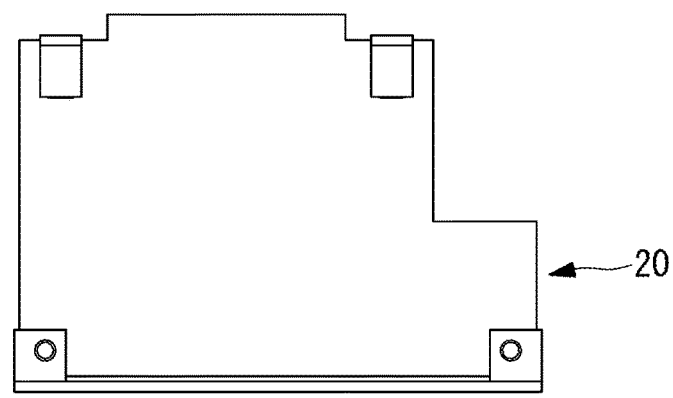
Figure 2:
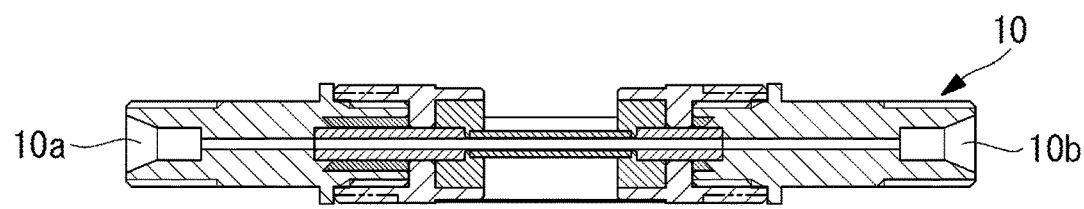
Figure 2:
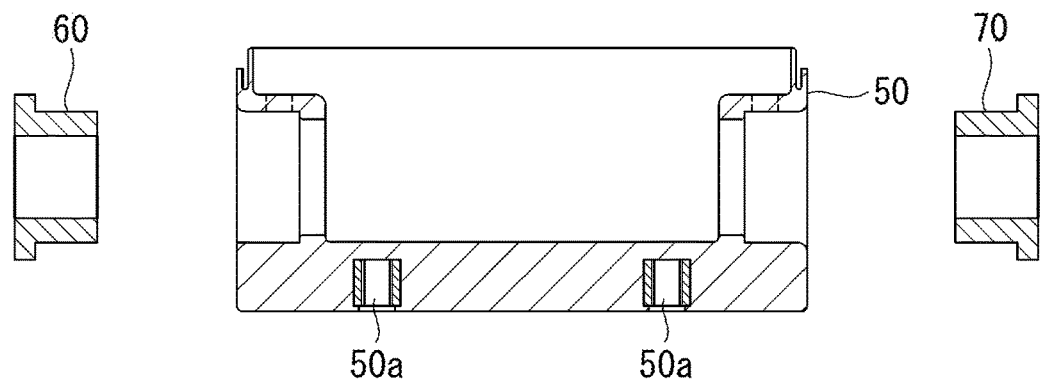

As shown in FIGS. 1 and 2, the thermal flowmeter 100 of the present embodiment includes a sensor section 10, a control substrate 20 (control section), a relay substrate 30, an upper case 40 and a bottom case 50.

Figure 3:
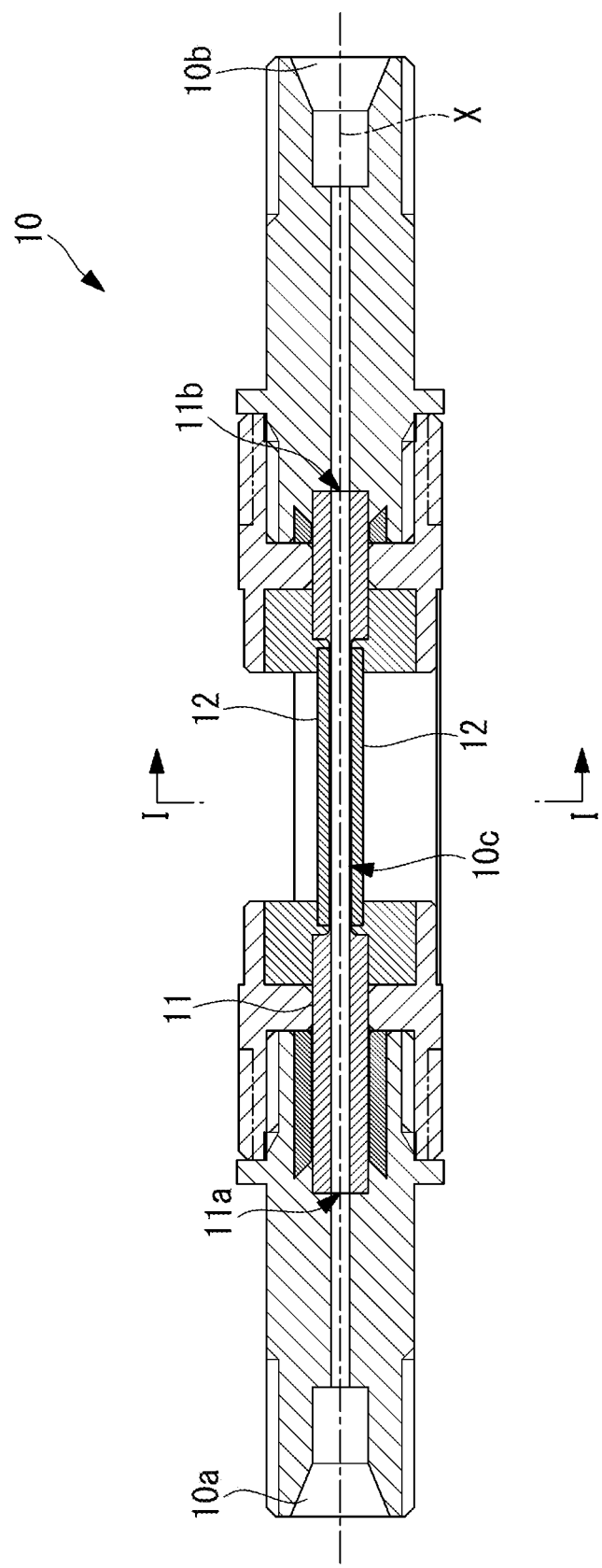
FIG. 3 is a vertical sectional view showing a sensor section shown in FIG. 2.

As shown in FIG. 3, the sensor section 10 allows a liquid that flows in from an inflow port 10a connected to an external pipe (not illustrated) to flow out from an outflow port 10b connected to an external pipe (not illustrated) and measures a flow rate of the liquid flowing in an internal flow passage 10c.

The sensor section 10 does not directly calculate the flow rate of the liquid, but detects a temperature of the liquid heated by a heating resistance wire 12a (heating resistor) which will be described later, by temperature detecting resistance wires 12b and 12c (temperature detecting resistors), and transmits temperature detection signals showing the detected temperatures to the control substrate 20 via a signal line (not illustrated). Details of the sensor section 10 will be described later.

The control substrate 20 shown in FIGS. 1 and 2 is a device that transmits a voltage signal to the heating resistance wire 12a of the sensor section 10 to heat the heating resistance wire 12a, and calculates a flow rate of the liquid based on temperatures transmitted from the temperature detecting resistance wires 12b and 12c.

The relay substrate 30 is a substrate that performs a relay for transmitting and receiving various signals between the control substrate 20 and an external device (not illustrated).

A cable 200 for transmitting and receiving various signals to and from the external device (not illustrated) is connected to the relay substrate 30.

The upper case 40 is a member to be a casing for an upper side of the thermal flowmeter 100, and houses the control substrate 20 therein.

The bottom case 50 is a member to be a casing for a lower side of the thermal flowmeter 100, and houses the sensor section 10 therein. In a state where the sensor section 10 is inserted in the bottom case 50, a stopper 60 is inserted to between the bottom case 50 and the sensor section 10 from an inflow port 10a side of the sensor section 10. Likewise, in the state where the sensor section 10 is inserted in the bottom case 50, a stopper 70 is inserted to between the bottom case 50 and the sensor section 10 from an outflow port 10b side of the sensor section 10. The sensor section 10 is in a state fixed to the bottom case 50 by the stoppers 60 and 70.

Fastening bores 50a are formed in a bottom surface of the bottom case 50, and the bottom case 50 is fixed to an installation surface by fastening bolts (not illustrated) that are inserted from below an installation surface (not illustrated).

Next, the sensor section 10 will be described in detail with reference to FIGS. 3 to 6.

As shown in FIG. 3, the sensor section 10 has a measurement tube 11, and a plurality of sensor substrates 12 (temperature detection substrates).

Figure 4:
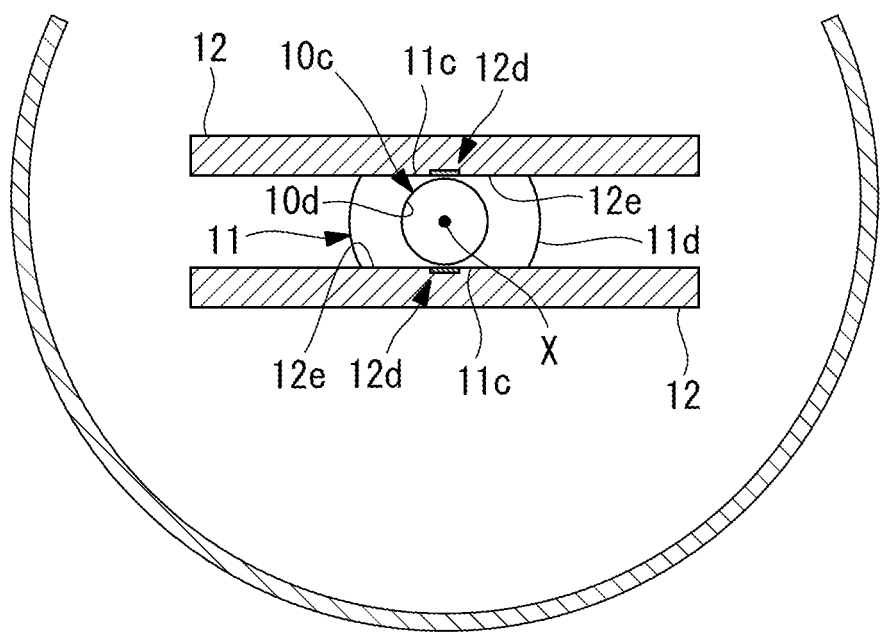
FIG. 4 is a sectional view in cutting-plane line I-I shown in FIG. 3.

The measurement tube 11 is a tube having an inflow port 11a through which the liquid flows in, and an outflow port 11b that allows the liquid which flows in from the inflow port 11a to flow out. As shown in FIG. 4 (a sectional view in a cutting-plane line I-I in FIG. 3), the internal flow passage 10c which extends along an axis X and is circular in sectional view is formed in the measurement tube 11. The measurement tube 11 is formed of glass (for example, quartz glass with a high content of silicon dioxide).

Figure 5:
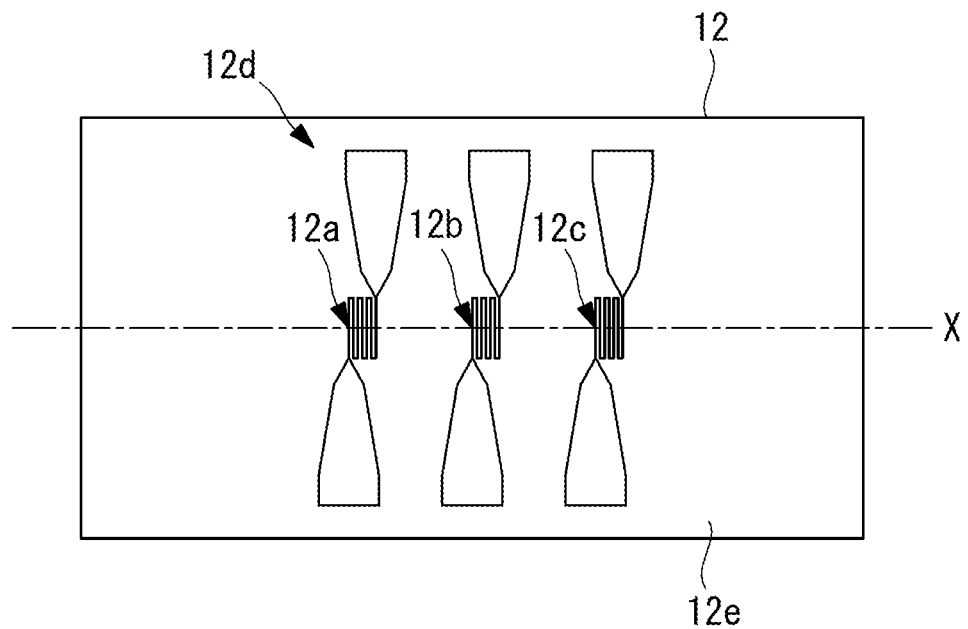
FIG. 5 is a plan view of a sensor substrate viewed from a detection surface side.

As shown in FIG. 5, the sensor substrate 12 is a substrate of glass (for example, borosilicate glass) in which a detection section 12d having the heating resistance wire 12a (heating resistor), the temperature detecting resistance wire 12b (temperature detecting resistor) and the temperature detecting resistance wire 12c (temperature detecting resistor) along the axis X is provided on a detection surface 12e.

The heating resistance wire 12a, the temperature detecting resistance wire 12b and the temperature detecting resistance wire 12c are formed by vapor-depositing metal films of platinum or the like onto the glass substrate respectively.

Figure 6:
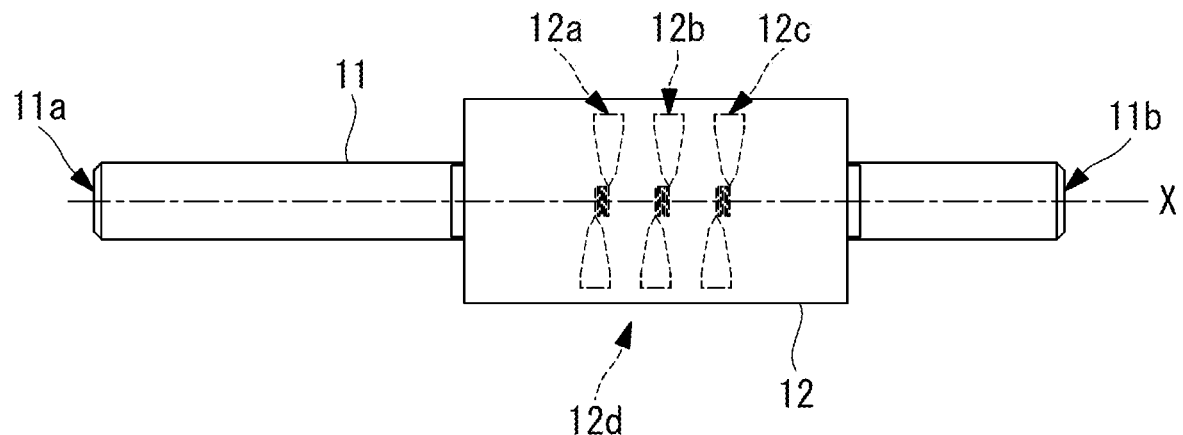
FIG. 6 is a plan view of a measurement tube to which the sensor substrate is bonded.

As shown in FIG. 6, the liquid flowing in the measurement tube 11 flows along the axis X to the outflow port 11b from the inflow port 11a. Consequently, when the heating resistance wire 12a is instantaneously heated, the heated liquid flows along the axis X and reaches a position of the temperature detecting resistance wire 12b, and thereafter reaches a position of the temperature detecting resistance wire 12c.

The control substrate 20 can calculate a flow velocity of the liquid which flows in the measurement tube 11 based on a timing at which the heating resistance wire 12a is instantaneously heated, and timings at which the temperature detecting resistance wire 2b and the temperature detecting resistance wire 12c detect the temperature of the heated liquid thereafter. Further, the control substrate 20 can calculate a flow rate of the liquid from the calculated flow velocity and a sectional area of the measurement tube 11. Details of a calculation method will be described later.

In FIG. 5, the temperature detecting resistance wire 12b and the temperature detecting resistance wire 12c are disposed at a downstream side in a flow direction of the liquid, of the heating resistance wire 12a, but other aspects may be adopted.

For example, the temperature detecting resistance wire 12b may be disposed at an upstream side in the flow direction of the liquid, of the heating resistance wire 12a, and the temperature detecting resistance wire 12c may be disposed at a downstream side in the flow direction of the liquid, of the heating resistance wire 12a. A temperature distribution created by the heating resistance wire 12a depends on the flow velocity of the liquid, and as the flow velocity becomes higher, more heat is carried to the downstream side to raise the temperature at the downstream side. The control substrate 20 can calculate the flow rate of the liquid based on a difference between the temperature detected by the temperature detecting resistance wire 12b and the temperature detected by the temperature detecting resistance wire 12c, and a sectional area of the measurement tube 11.

As shown in FIG. 4 (sectional view in a cutting-plane line I-I in FIG. 3), in the measurement tube 11, a section along a plane orthogonal to the axis X is in a substantially circle in which portions provided with the sensor substrates 12 are cut, in positions where the sensor substrates 12 are bonded. Surfaces on which detection surfaces 12e of the sensor substrates 12 are disposed to face each other, of an outer circumferential surface of the measurement tube 11, are flat surfaces 11c.

The flat surface 11c of the measurement tube 11 is disposed to face the detection surface 12e of the sensor substrate 12. The flat surface 11c and the detection surface 12e are bonded to each other by an adhesive.

Here, as the adhesive, for example, an epoxy resin adhesive, an ultraviolet-curable resin adhesive, a thermosetting resin adhesive (thermosetting adhesive), a low-melting-point glass and the like can be used.

A shortest distance (first distance) from the detection surface 12e of the sensor substrate 12 to an inner circumferential surface 10d of the internal flow passage 10c is shorter than a shortest distance (second distance) from an outer circumferential surface 11d of the measurement tube 11 to the inner circumferential surface 10d of the internal flow passage 10c. This is to increase heat conductivity to the liquid from the heating resistance wire 12a and improve temperature detection characteristic by the temperature detecting resistance wire 12b and the temperature detecting resistance wire 12c by reducing the first distance to the inner circumferential surface 10d of the internal flow passage 10c from the detection surface 12e of the sensor substrate 12.

The sensor substrate 12 is provided so that the detection surface 12e where the detection section 12d is formed faces a side of the internal flow passage 10c formed in the measurement tube 11. In the present embodiment, the two sensor substrates 12 are provided to face each other with the internal flow passage 10c therebetween. In the case of FIG. 4, the detection sections 12d provided at the respective two sensor substrates 12 are disposed at equal angular intervals with the axis X as a center. Specifically, the one sensor substrate 12 (detection section 12d) is installed at an upper position on the sheet surface, of the internal flow passage 10c, and the other sensor substrate 12 (detection section 12d) is installed at a lower position on the sheet surface, of the internal flow passage 10c.

Next, a method for calculating a flow rate will be described in detail.

As described above, the control substrate 20 can calculate the flow rate of the liquid flowing in the measurement tube 11, based on signals from the heating resistance wire 12a, the temperature detecting resistance wire 12b and the temperature detecting resistance wire 12c of the detection section 12d.

In the present embodiment, the two detection sections 12d are disposed at the equal angle intervals with the axis X as the center, so that the flow rate can be calculated by further performing an arithmetic operation by the control substrate 20 based on respective flow rates calculated based on the signals from the two detection sections 12d by the control substrate 20.

Figure 7:
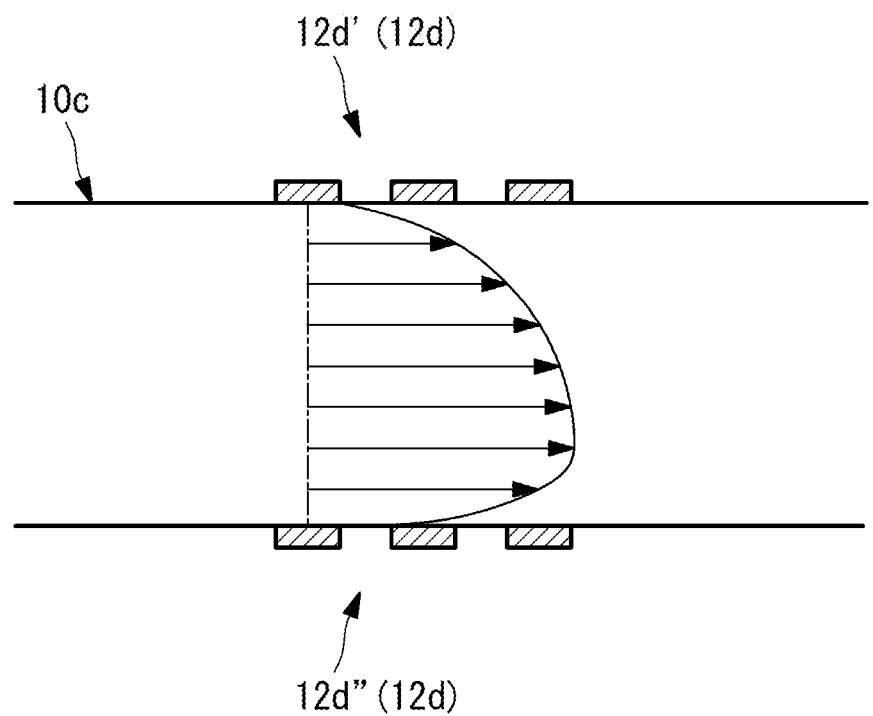
FIG. 7 is a view schematically showing an ununiform velocity distribution in an internal flow passage.

For example, as shown in FIG. 7, there may be a case where a velocity distribution of the liquid flowing in the internal flow passage 10c is not uniform. A flow where the velocity distribution is ununiform occurs when the external pipe (not illustrated) which is connected to the inflow port 10a bends, for example. In the case of FIG. 7, a flow velocity in the lower position on the sheet surface, of the internal flow passage 10c, is higher than a flow velocity in the upper position on the sheet surface.

In the state of the velocity distribution shown in FIG. 7, a difference is caused by an influence of the ununiform velocity distribution between the flow rate calculated based on the signal from the one detection section 12d (For example, the detection section 12d on an upper side in FIG. 7, and hereinafter, this is referred to as "detection section 12d'"), and a flow rate calculated based on a signal from another detection section 12d (For example, the detection section 12d at a lower side in FIG. 7, hereinafter this is referred to as "detection section 12d''".) In this case, the flow rate calculated from the detection section 12d'' is larger than the flow rate calculated from the detection section 12d'. Accordingly, when only the flow rate calculated based on the signal from the detection section 12d' is determined as the flow rate of the liquid flowing in the internal flow passage 10c, there arises a possibility that a smaller flow rate than an actual flow rate is calculated. Further, when only the flow rate calculated based on the signal from the detection section 12d'' is determined as the flow rate of the liquid flowing in the internal flow passage 10c, there arises a possibility that a larger flow rate than the actual flow rate is calculated.

In the present embodiment, an average value of the flow rate calculated based on the signal from the detection section 12d' and the flow rate calculated based on the signal from the detection section 12d'' is calculated by the control substrate 20.

Hereinafter, an example of an experimental result at a time of averaging is shown.

Figure 8:
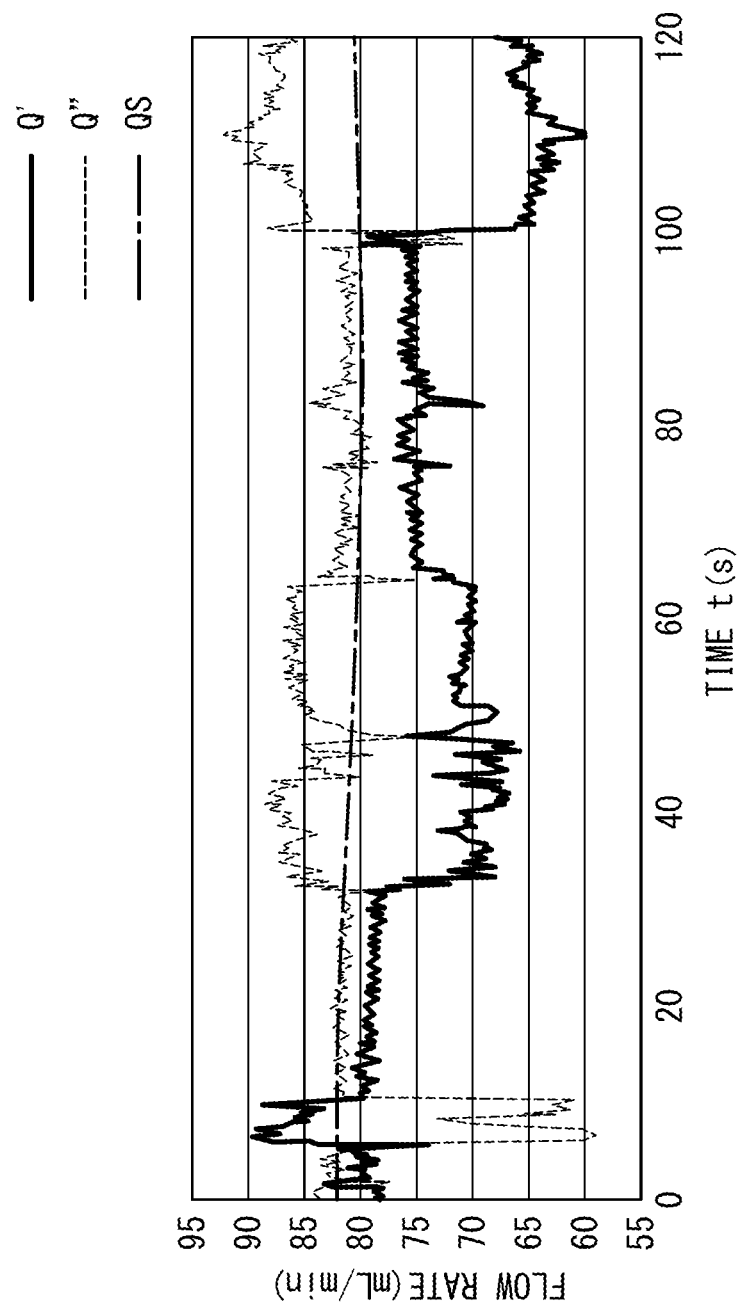
FIG. 8 is a diagram showing temporal changes of respective flow rates calculated based on signals from two detection sections and a flow rate by a reference flowmeter.

FIG. 8 shows a result of comparing a flow rate Q' calculated from the signal of the detection section 12d', a flow rate Q'' calculated from the signal of the detection section 12d'' facing the detection section 12d' with the internal flow passage 10c therebetween, and a flow rate QS measured by a reference flowmeter. Here, a vertical axis in FIG. 8 shows a flow rate (mL/min), and a horizontal axis shows a time t(s). On experiment, a tube (for example, a resin tube) which is connected to the inflow port 10a side and in which the liquid flows inside is artificially shaken in order to generate nonuniformity in the flow velocity distribution. As the reference flowmeter for example, a Coriolis flowmeter is used.

As shown in FIG. 8, a difference occurs to the flow rate Q' calculated based on the signal of the detection section 12d' or the flow rate Q'' calculated based on the signal of the detection section 12d'' from the flow rate QS measured by the reference flowmeter. For example, a difference of approximately −20 mL/min occurs between the flow rate Q' calculated based on the signal of the detection section 12d' and the flow rate QS by the reference flowmeter in a vicinity of t=110 s. A difference of approximately −25 mL/min occurs between the flow rate Q" calculated based on the signal of the detection section 12d" and the flow rate by the reference flowmeter in a vicinity of t=10 s. Further, the flow rate Q' calculated based on the signal from the detection section 12d' and the flow rate Q" calculated based on the signal from the detection section 12d" have a large degree of variation and are not stabilized. For example, a difference of approximately 30 mL/min occurs to the flow rate Q' and the flow rate Q" in the vicinity of t=110 s.

Figure 9:
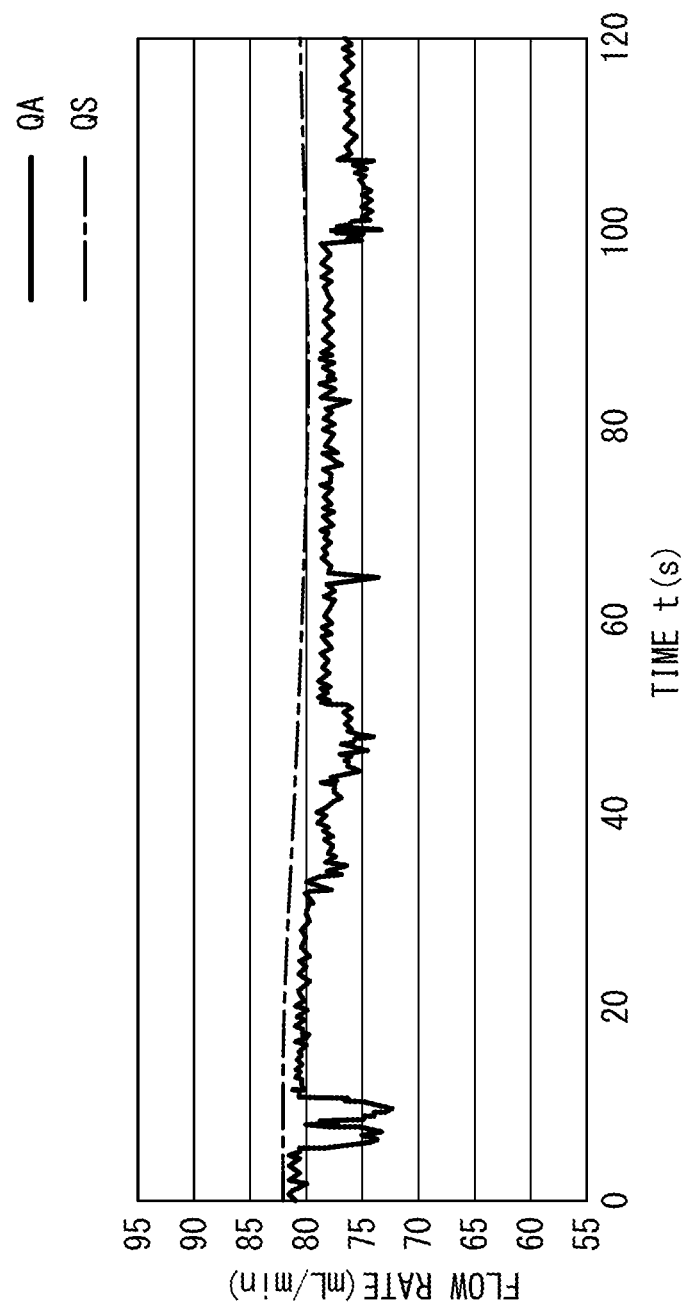
FIG. 9 is a diagram showing temporal changes of an average value of the respective flow rates calculated based on the signals from the two detection sections and the flow rate by the reference flowmeter.

FIG. 9 shows a result of comparing a flow rate QA by an average value of the flow rate Q' calculated based on the signal of the detection section 12d' and the flow rate Q" calculated from the signal of the detection section 12d", and the flow rate QS measured by the reference flowmeter.

As shown in FIG. 9, the flow rate QA by the average value has a small difference that occurs between the flow rate QA and the flow rate QS measured by the reference flowmeter as compared with the case of FIG. 8, and the difference is at most approximately −10 mL/min in a vicinity of t=10 s. This is because the difference of the flow rate Q' from the flow rate QS, and the difference of the flow rate Q" from the flow rate QS as shown in FIG. 8 are cancelled out by each other by averaging.

According to the present embodiment, the following effects are exhibited.

The flow rate can be calculated based on the signals from the detection sections 12d provided in the plurality of directions to the circumferential direction of the internal flow passage 10c. Even when the velocity distribution of the liquid flowing in the internal flow passage 10c is not uniform, a variation in the flow rate due to nonuniformity of the flow velocity distribution and the positions of the detection sections 12d can be suppressed by averaging the respective flow rates calculated based on the signals of the plurality of detection sections 12d provided with the predetermined intervals left in the circumferential direction by the control substrate 20. Accordingly, even when the velocity distribution of the liquid flowing through the internal flow passage 10c of the measurement tube 11 is not uniform, the flow rate can be measured with high precision as compared with the case where the flow rate is calculated based on the signal from the detection section 12d in one direction (for example, only the detection section 12d').

Further, when a difference of a predetermined value or more is detected by the control substrate 20 in the respective flow rates calculated based on the signals from the plurality of detection sections 12d, the installation state or connection state of the thermal flowmeter 100 or the flow passage tube connected to the thermal flowmeter 100 is determined as abnormal, and a user can be notified of the abnormality by generating an alert.

Second Embodiment

Hereinafter, a second embodiment of the present invention is described with reference to the drawings.

The thermal flowmeter 100 of the present embodiment differs from the first embodiment in the calculation method of a flow rate, and is similar to the first embodiment in the other points. Accordingly, only the point differing from the first embodiment is described, and for the other points, the same reference signs are used to omit explanation thereof.

In the present embodiment, a flow rate QW is calculated by weighting the flow rate Q' calculated based on the signal from the detection section 12d' and the flow rate Q" calculated based on the signal from the detection section 12d" and thereafter adding up the flow rate Q' and the flow rate Q".

Weighting is executed, for example, in such a manner that Q' and Q" are compared by the control substrate 20, a larger one is multiplied by a weighting factor X/10, and a smaller one is multiplied by a weighting factor (10−X)/10. Note that X is an integer of 1 to 9.

Figure 10:
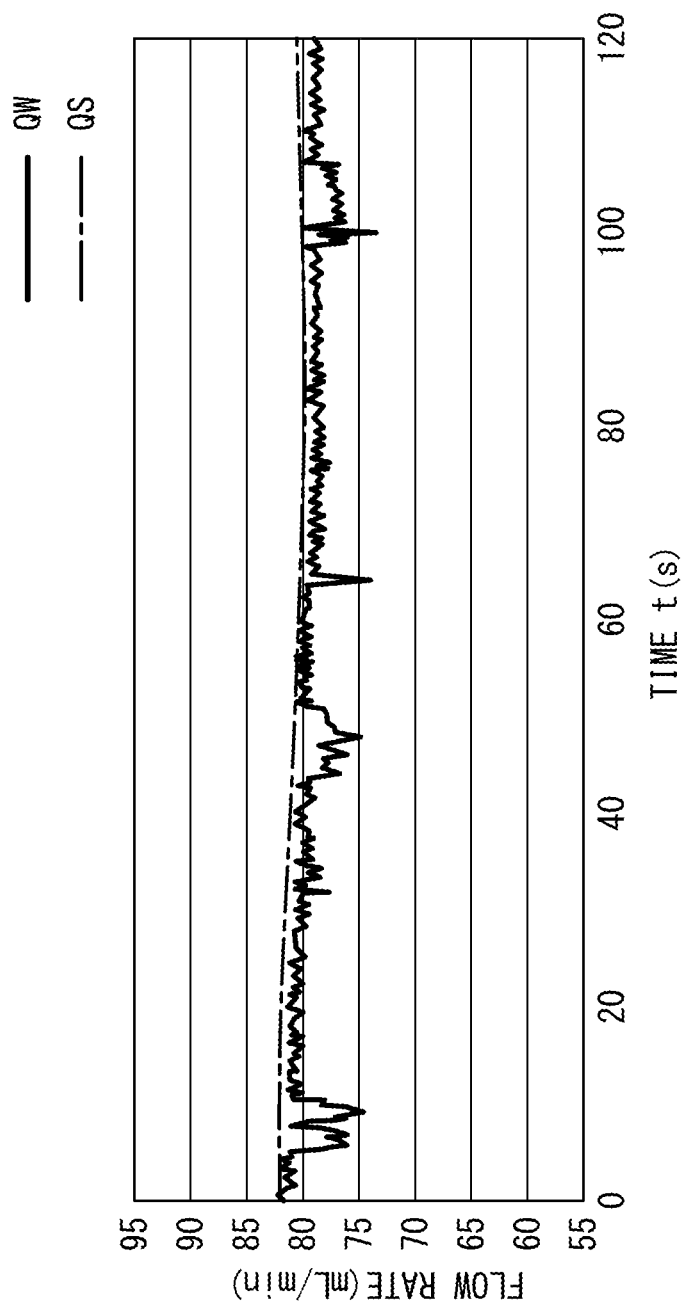
FIG. 10 is a diagram showing temporal changes of a weighted flow rate calculated from the respective flow rates calculated based on the signals from the two detection sections and the flow rate by the reference flowmeter.

FIG. 10 shows a result of comparing the flow rate QW by weighting, which is calculated by the control substrate 20 when X=7 is set, that is, when the larger flow rate is multiplied by a weighting factor 0.7, and the flow rate QS measured by the reference flowmeter. The flow rate QW by weighting has a smaller difference occurring from the flow rate QS measured by the reference flowmeter as compared with the case of FIG. 9, and the difference is at most approximately −7 mL/min in a vicinity of t=10 s.

The weighting factor is determined by the following experiment.

In this experiment, the flow rate of the liquid flowing in the internal flow passage 10c is increased every 70 seconds to 20 mL/min, 40 mL/min, 60 mL/min, 80 mL/min and 95 mL/min. In the experiment, in order to cause nonuniformity in the flow velocity distribution, a resin tube which is connected to the inflow port 10a side and in which the liquid flows inside is artificially shaken when approximately 35 seconds elapses in the respective flow rates.

Figure 11:
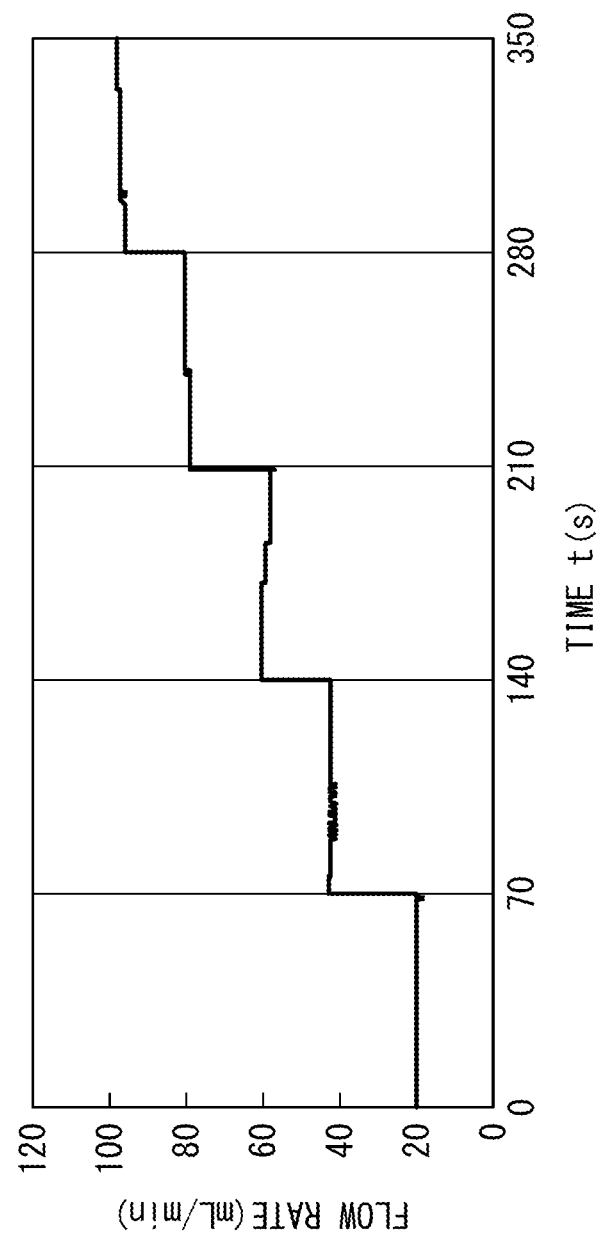
FIG. 11 is a diagram showing a temporal change of the flow rate by the reference flowmeter.
Figure 12:
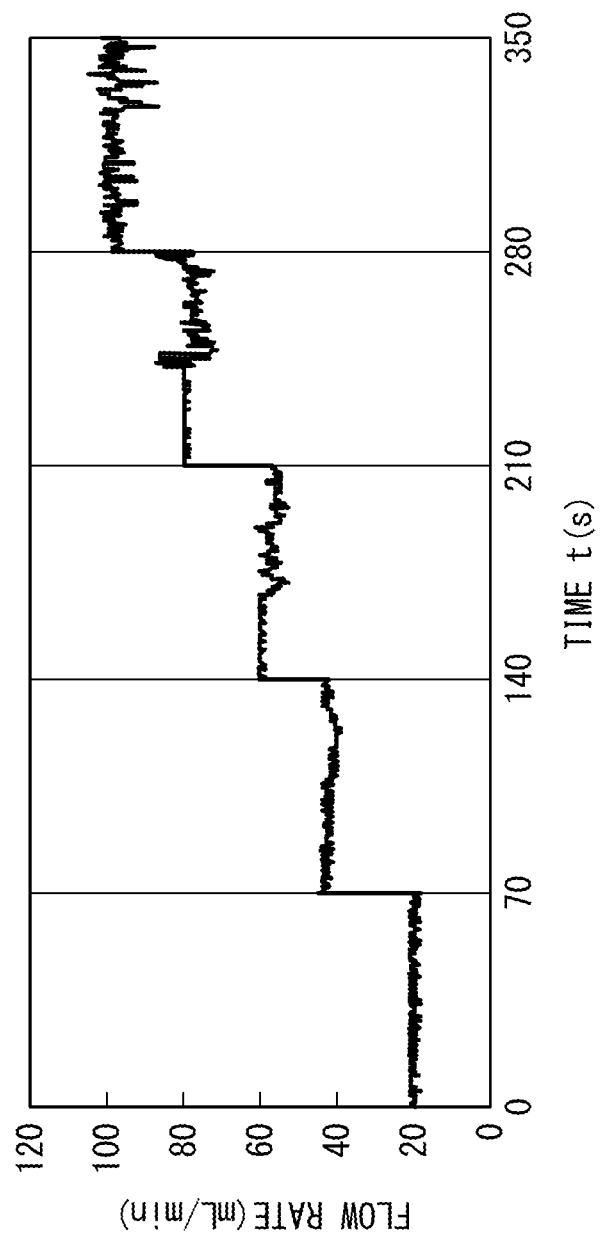
FIG. 12 is a diagram showing a temporal change of a flow rate calculated based on a signal from one detection section.
Figure 13:
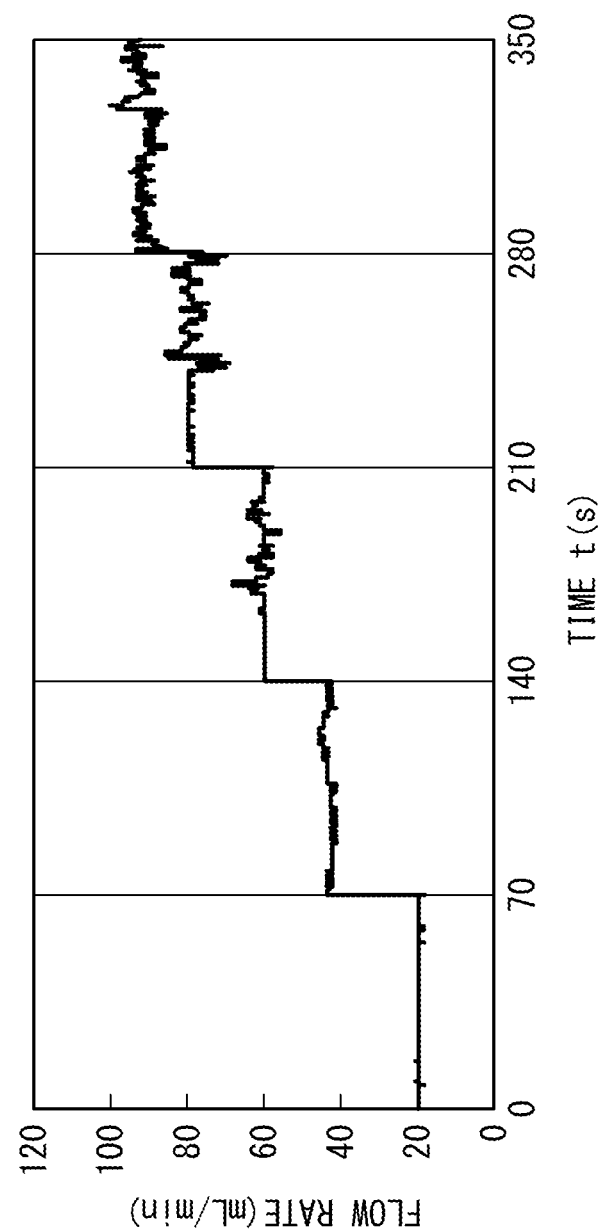
FIG. 13 is a diagram showing a temporal change of a flow rate calculated based on a signal from another detection section.

FIG. 11 shows the flow rate QS to be the reference which is measured by a Coriolis flowmeter. FIG. 12 shows the flow rate Q' calculated based on the signal of the detection section 12d'. Further, FIG. 13 shows the flow rate Q" calculated from the signal of the detection section 12d" facing the detection section 12d' with the internal flow passage 10c therebetween. Here, vertical axes of FIGS. 11 to 13 represent flow rates (mL/min) and horizontal axes represent times t(s).

Figure 14:
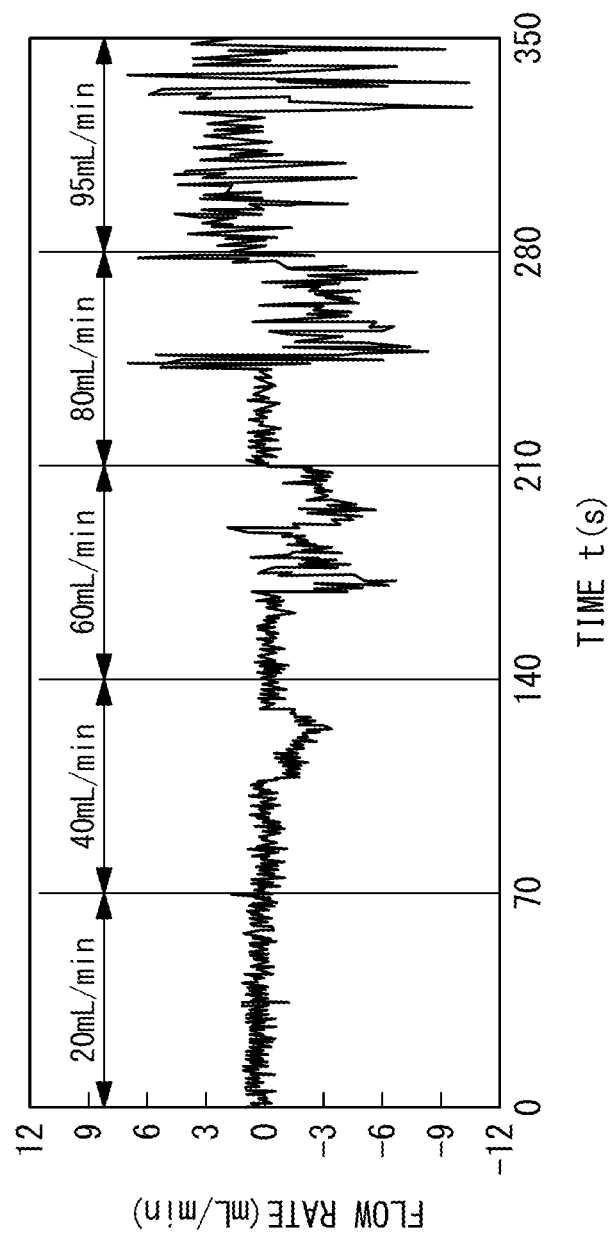
FIG. 14 is a diagram showing a temporal change of a difference between the flow rate calculated based on the signal from the one detection section and the flow rate by the reference flowmeter.
Figure 15:
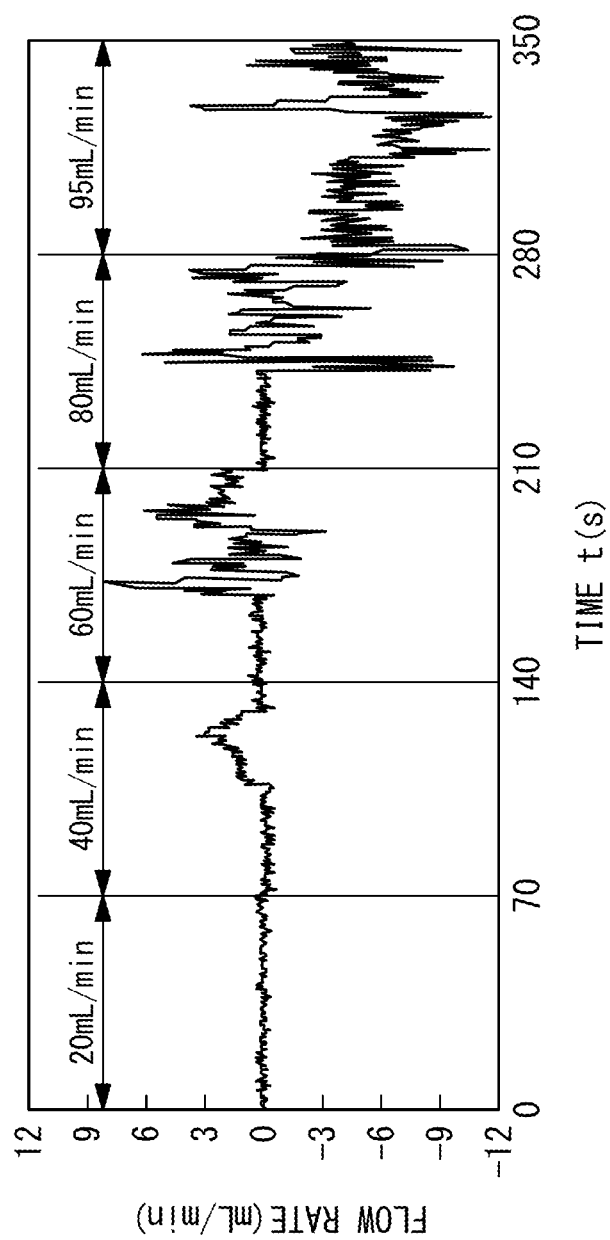
FIG. 15 is a diagram showing a temporal change of a difference between the flow rate calculated based on the signal from another detection section and the flow rate by the reference flowmeter.

FIG. 14 shows a difference dQ' between the flow rate Q' and the flow rate QS. FIG. 15 shows a difference dQ" between the flow rate Q" and the flow rate QS. Here, in FIGS. 14 and 15, vertical axes represent differences (mL/min) of the flow rates, and horizontal axes represent times t(s). As shown in FIGS. 14 and 15, when the flow rates reach 60 mL/min or more, nonuniformity of the flow velocity distribution appears remarkably. Further, in regions where nonuniformity of the flow velocity distributions appears remarkably, absolute values of the difference dQ' and the difference dQ" do not correspond to each other and no symmetry is found. That is, even when the flow rates are simply averaged, the mutual differences are unlikely to be sufficiently cancelled out.

Thus, the flow rate QW is calculated by weighting the flow rate Q' calculated based on the signal of the detection section 12d' and the flow rate Q" calculated based on the signal of the detection section 12d", and thereafter adding up the flow rate Q' and the flow rate Q". The flow rate QW by weighting is calculated by the following method: the flow rate Q' by the detection section 12d' and the flow rate Q" by the detection section 12d" are compared; the larger flow rate is multiplied by a weighting factor X/10 and the smaller flow rate is multiplied by a weighting factor (10−X)/10; and thereafter the flow rate Q' and the flow rate Q" are added up. Note that X is an integer from 1 to 9.

Figure 16:
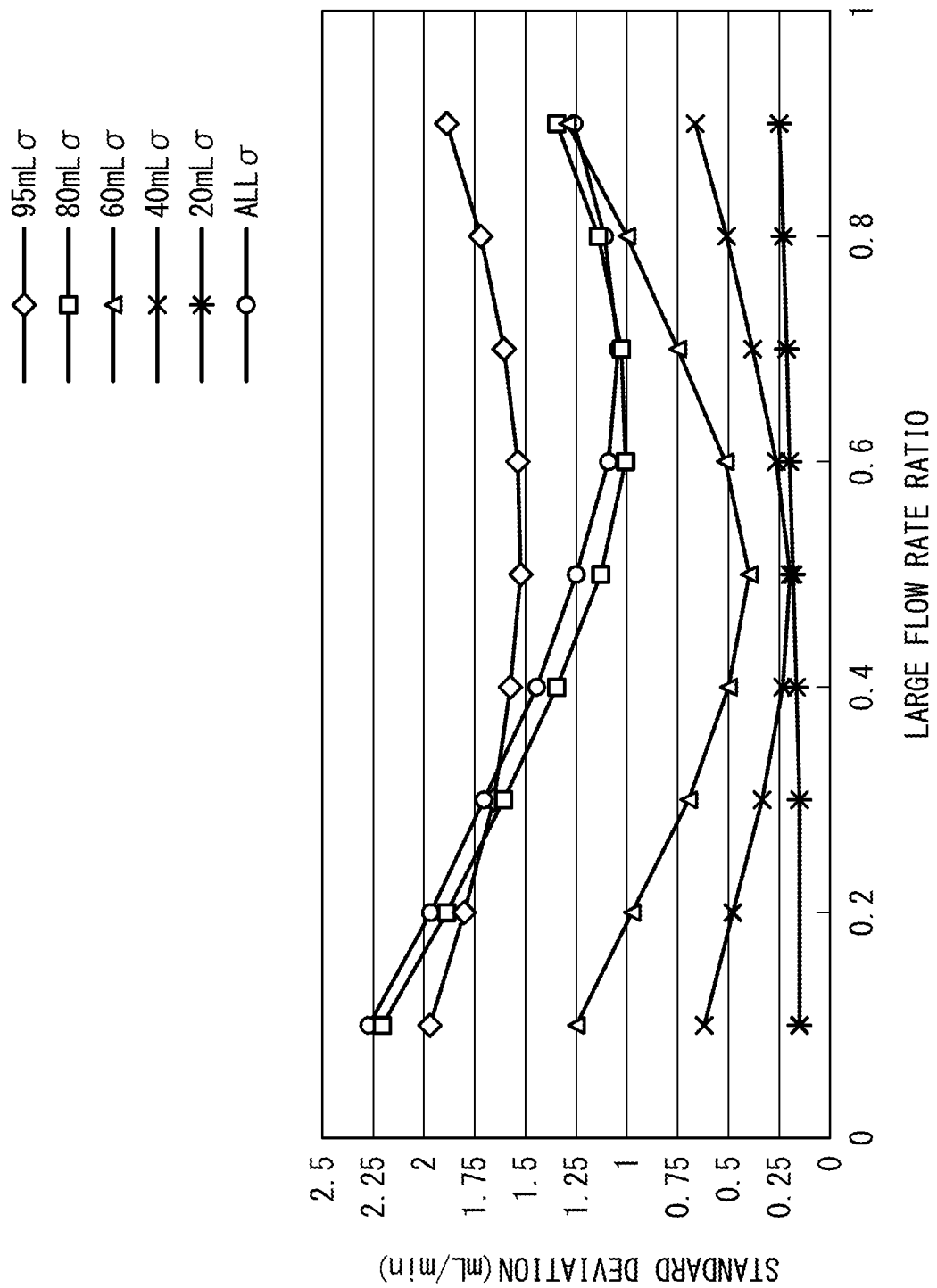
FIG. 16 is a diagram showing relationships between weighting factors and a standard deviation in respective flow rates.

FIG. 16 shows a relationship between the weighting factor X/10 (horizontal axis), and a standard deviation σ of the flow rate QW by the weighting to the flow rate QS (vertical axis) in each of flow rates (20 mL/min, 40 mL/min, 60 mL/min, 80 mL/min, 95 mL/min). In this experiment, in respective cases of X=1, 2, 3, . . . , 9, in each of the flow rates, the flow rate QW by weighting is calculated, and the standard deviation σ is obtained. Here, for example, the standard deviation σ in the case of the flow rate being 20 mL/min is described as 20 mLσ. FIG. 16 illustrates the standard deviation σ in all the flow rates as ALLEY, in addition to the relationship between the weighting factor X/10 and the standard deviation σ in each of the flow rates.

As shown in FIG. 16, in the standard deviation σ in each of the flow rates, the standard deviation σ decreases in substantially X=5 to 7 (weighting factor X/10=0.5 to 0.7). In other words, in X=5 to 7, a discrepancy of the flow rate QW by weighting from the flow rate QS which is the reference decreases. In particular, in a value of ALLEY, the standard deviation σ becomes the smallest in X=7. From the result, the discrepancy of the flow rate QW by weighting and the flow rate QS which is the reference can be decreased by setting X=7. Note that in the case of setting X=5, a process thereof is equal to averaging the flow rate, which is the same as in the first embodiment.

Note that in the aforementioned experiment, the weighting factor is acquired by the two detection sections 12d (the detection section 12d' and the detection section 12d"), but may be acquired by three or more detection sections 12d. In this case, a number of combinations of the flow rates by weighting and the standard deviation is increased, and thereby a suitable weighting factor can be acquired.

According to the present embodiment, the following effects are exhibited.

Even when the velocity distribution of the liquid that flows through the internal flow passage 10c of the measurement tube 11 is not uniform, nonuniformity of the flow velocity is substantially cancelled. Further, depending on the velocity distribution of the liquid flowing through the internal flow passage 10c, the flow rate can be measured with higher precision as compared with the case where the flow amount Q' and the flow amount Q" are simply averaged.

Note that X in the weighting factor X/10 is not limited to X=7, but may be arbitrarily changed in accordance with the flow rate which is used. For example, an application of the thermal flowmeter is considered, and in response to a flow rate range that is expected in the application, the value of X can be changed based on data acquired in advance by an experiment. Change of X is executed by the control substrate 20, for example.

Figure 17:
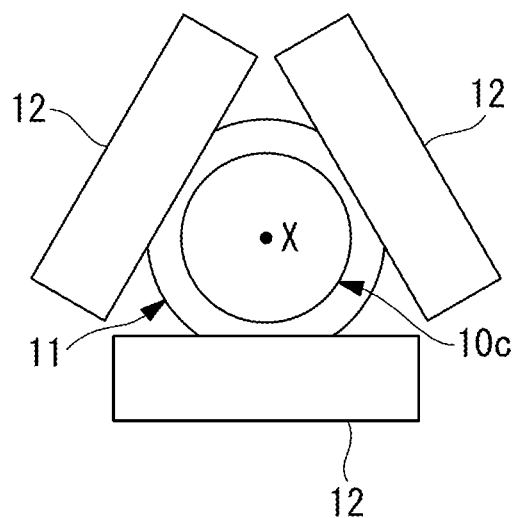
FIG. 17 is a view showing a modification of disposition of the sensor substrate.
Figure 18:
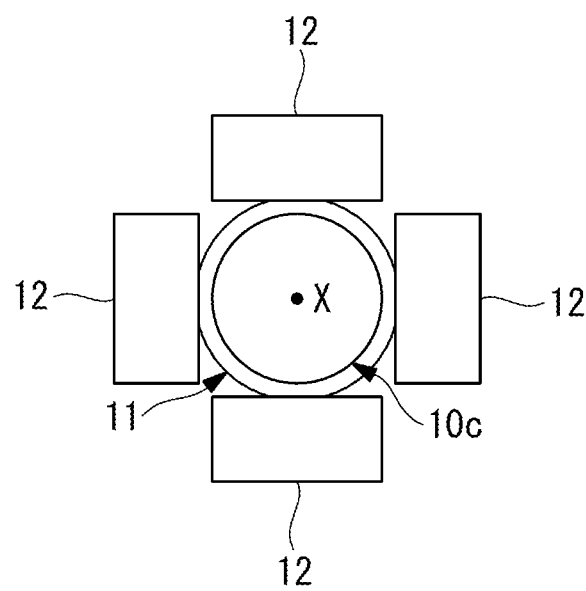
FIG. 18 is a view showing another modification of the disposition of the sensor substrate.

In the aforementioned first and second embodiments, three of the sensor substrates 12 each provided with the detection section 12d may be prepared as shown in FIG. 17, for example, and may be installed at intervals of 120° (equal angle intervals) in the circumferential direction of the measurement tube 11 with the axis X as the center. Further, as shown in FIG. 18, four of the sensor substrates 12 may be prepared, and may be installed at intervals of 90° (equal angle intervals) in the circumferential direction of the measurement tube 11 with the axis X as the center. In this case, as compared with the case of the two sensor substrates 12 (detection sections 12d) as in the first and second embodiments, the flow rate can be measured with higher precision. Note that, for example, when the three sensor substrates 12 are used and the flow rate by weighting is used, a suitable weighting factor can be acquired in advance by an experiment using the three detection sections 12d.

REFERENCE SIGNS LIST

10 Sensor section
10a Inflow port
10b Outflow port
10c Internal flow passage
10d Inner circumferential surface
11 Measurement tube
11a Inflow port
11b Outflow port
11c Flat surface
12 Sensor substrate (temperature detection substrate)
12a Heating resistance wire (heating resistor)
12b, 12c Temperature detecting resistance wire (temperature detecting resistor)
12d, 12d', 12d" Detection section
12e Detection surface
20 Control substrate (control section)
100 Thermal flowmeter

The invention claimed is:

1. A thermal flowmeter, comprising:
a measurement tube that has an inflow port into which a liquid flows and an outflow port that allows the liquid which flows in from the inflow port to flow out, and has an internal flow passage where the liquid flow is formed to extend along an axis;
a plurality of detection sections each of which has a heating resistor and a temperature detecting resistor along the axis and is provided at the measurement tube; and
a control section that calculates a flow rate of the liquid flowing through the internal flow passage based on signals from the plurality of detection sections,
wherein the plurality of detection sections are respectively provided with predetermined intervals in a circumferential direction with the axis as a center,
the control section calculates the flow rate of the liquid flowing in the internal flow passage by weighting respective flow rates obtained based on signals from the respective detection sections and thereafter adding up the respective flow rates, and
the control section compares a flow rate obtained based on a signal from one of the detection sections and a flow rate obtained based on a signal from another of the detection sections, and weights a larger flow rate more heavily than a small flow rate.

2. The thermal flowmeter according to claim 1,
wherein the plurality of detection sections are provided at equal angle intervals in the circumferential direction with the axis as the center.

3. A method for determining a weighting factor of a thermal flowmeter, the thermal flowmeter including:
a measurement tube that has an inflow port into which a liquid flows and an outflow port that allows the liquid which flows in from the inflow port to flow out, and has an internal flow passage where the liquid flows is formed to extend along an axis,
a plurality of detection sections each of which has a heating resistor and a temperature detecting resistor along the axis and is provided at the measurement tube, and
a control section that calculates a flow rate of the liquid flowing through the internal flow passage based on signals from the respective detection sections,
wherein the respective detection sections are respectively provided with predetermined intervals in a circumferential direction with the axis as a center, and
the control section calculates the flow rate of the liquid flowing in the internal flow passage by multiplying respective flow rates obtained based on signals from the respective detection sections by a weighting factor and thereafter adding up the respective flow rates, the method comprising:

a step of causing a liquid at a reference flow rate that is already known to flow through the internal flow passage;

a step of using a plurality of the weighting factors to calculate a plurality of weighted flow rates corresponding to the respective weighting factors;

a step of calculating a standard deviation of each of the weighted flow rates from the reference flow rate; and a step of acquiring the weighting factor at a time of the standard deviation becoming smallest.

* * * * *